United States Patent
Suganuma et al.

(10) Patent No.: US 9,126,493 B2
(45) Date of Patent: Sep. 8, 2015

(54) POWER SUPPLY CONTROL DEVICE AND INFORMATION PROVISION DEVICE

(75) Inventors: Hideaki Suganuma, Yokohama (JP); Mamoru Kuraishi, Ome (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 294 days.

(21) Appl. No.: 13/519,533

(22) PCT Filed: Feb. 21, 2011

(86) PCT No.: PCT/JP2011/053746
§ 371 (c)(1),
(2), (4) Date: Jun. 27, 2012

(87) PCT Pub. No.: WO2011/102515
PCT Pub. Date: Aug. 25, 2011

(65) Prior Publication Data
US 2012/0306446 A1 Dec. 6, 2012

(30) Foreign Application Priority Data

Feb. 22, 2010 (JP) .................. 2010-036094
Mar. 1, 2010 (JP) .................. 2010-044094

(51) Int. Cl.
| H02J 7/00 | (2006.01) |
| B60L 11/18 | (2006.01) |
| H02J 3/00 | (2006.01) |

(52) U.S. Cl.
CPC ......... B60L 11/1824 (2013.01); B60L 11/1844 (2013.01); *B60L 2230/30* (2013.01);
(Continued)

(58) Field of Classification Search
CPC ....... Y02T 90/16; Y02T 90/12; Y02T 90/128; Y02T 90/121; Y02T 90/163
USPC .......................................... 320/106–107, 109
See application file for complete search history.

(56) References Cited

U.S. PATENT DOCUMENTS 7,778,746 B2* 8/2010 McLeod et al. .................. 701/22
8,054,038 B2* 11/2011 Kelty et al. ..................... 320/109
(Continued)

FOREIGN PATENT DOCUMENTS

| DE | 11 2008 000 424 T5 | 12/2009 |
| JP | A-09-119839 | 5/1997 |
(Continued)

OTHER PUBLICATIONS

International Search Report issued in Application No. PCT/JP2011/053746; Dated May 17, 2011 (With Translation).

*Primary Examiner* — Stacy Whitmore
(74) *Attorney, Agent, or Firm* — Oliff PLC

(57) ABSTRACT

A power supply control device including: traffic information acquisition means for acquiring traffic information for roads in the vicinity of the charging station; and control means for controlling an amount of power which is to be supplied to the charging station based on the traffic information (particularly, a traffic flow of vehicles having possibility of using the charging station) acquired by the traffic information acquisition means. An information provision device including: charging station information acquisition means for acquiring information on charging stations; traffic-flow acquisition means for acquiring a traffic flow of vehicles using external electrical energy in the vicinity of each charging station on which the information is acquired by the charging station information acquisition means; and charging station determination means for determining a charging station on which the information is to be provided among the charging station based on the traffic flow acquired by the traffic-flow acquisition means.

6 Claims, 7 Drawing Sheets

(52) U.S. Cl.
CPC ............... *H02J 3/00* (2013.01); *Y02E 60/721* (2013.01); *Y02T 10/7005* (2013.01); *Y02T 10/7088* (2013.01); *Y02T 90/12* (2013.01); *Y02T 90/121* (2013.01); *Y02T 90/128* (2013.01); *Y02T 90/14* (2013.01); *Y02T 90/163* (2013.01); *Y04S 10/126* (2013.01)

(56) References Cited

U.S. PATENT DOCUMENTS

| | | | |
|---|---|---|---|
| 8,463,472 B2 * | 6/2013 | Watanabe | 701/22 |
| 8,577,528 B2 * | 11/2013 | Uyeki | 701/22 |
| 2006/0086406 A1 | 4/2006 | Sato et al. | |
| 2009/0021213 A1 * | 1/2009 | Johnson | 320/109 |
| 2009/0251300 A1 * | 10/2009 | Yasuda et al. | 340/426.1 |
| 2009/0313098 A1 * | 12/2009 | Hafner et al. | 705/14.1 |
| 2011/0010043 A1 * | 1/2011 | Lafky | 701/33 |
| 2011/0025267 A1 * | 2/2011 | Kamen et al. | 320/109 |
| 2011/0029146 A1 * | 2/2011 | Muller et al. | 700/293 |
| 2011/0074350 A1 * | 3/2011 | Kocher | 320/109 |
| 2011/0144823 A1 * | 6/2011 | Muller et al. | 700/297 |
| 2011/0193522 A1 * | 8/2011 | Uesugi | 320/109 |
| 2011/0225105 A1 * | 9/2011 | Scholer et al. | 705/412 |
| 2011/0266996 A1 | 11/2011 | Sugano | |
| 2012/0019203 A1 * | 1/2012 | Kressner | 320/109 |

FOREIGN PATENT DOCUMENTS

| | | |
|---|---|---|
| JP | A-09-210702 | 8/1997 |
| JP | A-09-266602 | 10/1997 |
| JP | A-10-170293 | 6/1998 |
| JP | A-10-260050 | 9/1998 |
| JP | A-2001-215124 | 8/2001 |
| JP | A-2002-216296 | 8/2002 |
| JP | A-2003-262525 | 9/2003 |
| JP | A-2004-020195 | 1/2004 |
| JP | A-2005-017194 | 1/2005 |
| JP | A-2005-143218 | 6/2005 |
| JP | A-2006-113890 | 4/2006 |
| JP | A-2006-146862 | 6/2006 |
| JP | A-2006-235846 | 9/2006 |
| JP | A-2007-116799 | 5/2007 |
| JP | A-2007-206889 | 8/2007 |
| JP | A-2007-274827 | 10/2007 |
| JP | A-2009-030993 | 2/2009 |
| JP | A-2009-171647 | 7/2009 |
| JP | A-2010-022099 | 1/2010 |

* cited by examiner

POWER SUPPLY CONTROL DEVICE AND INFORMATION PROVISION DEVICE

TECHNICAL FIELD

The present invention relates to a power supply control device controlling the supply of power to a charging station and an information provision device providing information on a charging station to a vehicle requiring charging.

BACKGROUND ART

A plug-in hybrid vehicle, an electric vehicle, or the like includes a secondary battery and can be externally charged. In order to perform charging of such a vehicle, a charging station equipped with a charging device is installed (refer to Patent Literature 1). Power is supplied from power transmission facilities or the like of a power company to the charging station. For example, the amount of power which is to be stored in the charging station is adjusted based on a rate of operation (statistical result) which is derived from the result of the charging from the charging device to each vehicle.

CITATION LIST

Patent Literature

[Patent Literature 1] Japanese Unexamined Patent Application Publication No. 9-266602
[Patent Literature 2] Japanese Unexamined Patent Application Publication No. 2003-262525
[Patent Literature 3] Japanese Unexamined Patent Application Publication No. 2001-215124
[Patent Literature 4] Japanese Unexamined Patent Application Publication No. 2009-30993
[Patent Literature 5] Japanese Unexamined Patent Application Publication No. 10-170293

SUMMARY OF INVENTION

Technical Problem

The number of vehicles using a charging station varies from moment to moment, and the manner of the change also varies according to the time period, location, or the like. In addition, since the number of installed charging stations is still small, in some cases, vehicles may temporarily concentrate on a small number of charging stations. Therefore, in some cases, the rate of operation (average value) based on the result of the supply of power may not be matched with a real-time rate of operation of a charging station. Accordingly, if the supply of power to the charging station is performed based on the rate of operation based on the result of the supply of power, there may be a problem in that the amount of power of the charging station may be excessive or insufficient. For example, in the case where the number of charging vehicles drastically increases in a narrow time period at a charging station, there is some possibility that the amount of power of the charging station may be insufficient from the last half of the temporary time period. In this case, there is a problem in that appropriate charging cannot be performed.

Therefore, an object of the invention is to provide a power supply control device capable of allowing appropriate charging by performing supplying of appropriate power to a charging station in real time.

On the other hand, disclosed is a technique providing information on a charging station to a vehicle requiring charging.

For example, Patent Literature 2 discloses a technique where, in the case where it is determined that charging of a battery is to be required until an electric vehicle arrives at a destination, position information of a charging station in the vicinity of a current position, availability information (available time based on a usage situation of other vehicles) of a charging device in the charging station, a necessary charging time, or the like is provided.

Since the number of charging stations is still small, if there are many vehicles requiring charging in the vicinity of the charging station, the vehicles concentrate on the charging station. Therefore, in some cases, during the time when a vehicle arrives at the charging station on which information is provided, the charging station becomes crowded. As a result, there may be a problem that the waiting time until the charging starts increases or sufficient charging time cannot be secured. In this case, rapid charging (short-time charging with high voltage) is inevitable. In the case of the rapid charging, the battery deteriorates earlier than normal charging, and the battery cannot be fully charged. In other words, in this case, there is also a problem in that appropriate charging cannot be performed.

Therefore, another object of the invention is to provide an information provision device capable of allowing appropriate charging by providing information on a charging station appropriate for a vehicle requiring charging to the vehicle.

Solution to Problem

According to an aspect of the invention, there is provided a power supply control device controlling the supply of power to a charging station, including: traffic information acquisition means for acquiring traffic information for roads in the vicinity of the charging station; and control means for controlling an amount of power which is to be supplied to the charging station based on the traffic information for roads in the vicinity of the charging station acquired by the traffic information acquisition means.

In the power supply control device, the traffic information for roads in the vicinity of the charging station is acquired by the traffic information acquisition means. The traffic information includes, for example, a traffic flow (the number of vehicles), a vehicle type, a driving type of vehicle. Next, in the power supply control device, the amount of power which is to be supplied to the charging station is controlled by the control means based on the traffic information for roads in the vicinity of the charging station. Since the rate of operation of the charging station can be estimated from the traffic information (particularly, a traffic flow of vehicles having possibility of using the charging station) in the vicinity of the charging station in real time with high accuracy, the amount of power required by the charging station can be determined in real time. Accordingly, the supply of power is performed at any time according to the required amount of power. Therefore, the amount of power stored in the charging station is always maintained to be an appropriate amount, so that it is possible to prevent the amount of power of the charging station from being too large and too small. In this manner, in the power supply control device, the amount of power which is to be supplied to the charging station is controlled based on the traffic information for roads in the vicinity of the charging station, so that it is possible to perform the supplying of appropriate power to the charging station in real time. Therefore, it is possible to avoid the amount of power in the charging station being insufficient, so that it is possible to perform appropriate charging.

In the power supply control device according to the above aspect of the invention, the control means estimates a rate of operation of the charging station based on the traffic information and controls the amount of power which is to be supplied to the charging station based on the estimated rate of operation. In this manner, the rate of operation of the charging station is estimated based on the traffic information for roads in the vicinity of the charging station, and the amount of power to be supplied is controlled based on the rate of operation, so that it is possible to perform the supply of more appropriate power in real time.

In addition, in the power supply control device according to the above aspect of the invention, it is preferable that the control means counts motor-driven vehicles that include externally chargeable batteries and have a possibility of charging based on the traffic information and estimates the rate of operation based on the number of counts and the actual operating situation of the charging station. In this case, since the rate of operation is estimated based on the number of vehicles having a possibility of charging and the actual operation situation of the charging station, it is possible to obtain a useful rate of operation.

In addition, in the power supply control device according to the above aspect of the invention, it is preferable that the control means takes into consideration at least one of weather information, accident information, and traffic restriction information at the time of estimating the rate of operation. For example, in the case where it rains or snows or in the case where traffic congestion occurs due to an accident or traffic restriction, it is estimated that the number of charging vehicles will be increased. Therefore, it is possible to obtain a more useful rate of operation by estimating the rate of operation by taking into consideration weather information, accident information, or traffic restriction information.

In addition, in the power supply control device according to the above aspect of the invention, it is preferable that the control means controls the amount of power which is to be supplied to the charging station by changing at least one of a power generation amount of private power generation of the charging station and a charged amount of a storage battery of the charging station. In this case, during the control of the amount of power which is to be supplied to the charging station, a variety of influences caused by an external power supply source are reduced.

According to another aspect of the invention, there is provided an information provision device providing information on a charging station to a vehicle requiring charging, including: charging station information acquisition means for acquiring information on charging stations; traffic-flow acquisition means for acquiring a traffic flow of vehicles using external electrical energy in the vicinity of each of the charging stations on which the information is acquired by the charging station information acquisition means; and charging station determination means for determining the charging station on which the information is to be provided among the charging stations on which the information is acquired by the charging station information acquisition means based on the traffic flow of the vehicles using external electrical energy in the vicinity of each of the charging stations, which is acquired by the traffic-flow acquisition means.

In the information provision device, the charging station information acquisition means acquires information (for example, position information, spec information, operation information) on the charging station which the vehicle requiring charging can travel to. Next, in the information provision device, the traffic-flow acquisition means acquires a traffic flow (for example, the number of vehicles, a degree of congestion, and a travel time between points) of vehicles using external electrical energy (for example, plug-in hybrid vehicles and electric vehicles) in the vicinity of each charging station. Since the number of vehicles which performs charging at a charging station increases in proportion to the number of vehicles using external electrical energy in the vicinity of the charging station, it is possible to estimate the degree of congestion (rate of operation) of the charging station from the traffic flow of the vehicles using external electrical energy in the vicinity of the charging station with high accuracy. In order to shorten the waiting time for the charging and to secure a sufficient charging time, it is preferable that the charging station not be congested. Accordingly, in the information provision device, the charging station determination means determines the charging station on which the information is to be provided based on the traffic flow of the vehicles using external electrical energy in the vicinity of each charging station and provides the information on the determined charging station to the vehicle requiring charging. In this manner, in the information provision device, the charging station on which the information is to be provided is determined based on the traffic flow of the vehicles using external electrical energy in the vicinity of the charging station, so that it is possible to provide the information on the charging station appropriate for the vehicle requiring charging to the vehicle. Therefore, when the vehicle requiring charging arrives at the charging station, the waiting time for starting the charging is small or there is no waiting time, so that it is possible to secure a sufficient charging time. As a result, if a user of the vehicle so desires, normal charging can also be performed. Therefore, it is possible to avoid the rapid charging being inevitably performed, so that it is possible to perform appropriate charging.

In the information provision device according to the above aspect of the invention, it is preferable that the charging station information acquisition means acquires spec information of charging devices equipped in the charging stations, and the charging station determination means determines the charging station on which the information is to be provided among the charging stations equipped with the charging devices having specs appropriate for specs relating to charging of the vehicle requiring charging based on the spec information of the charging devices acquired by the charging station information acquisition means.

In the information provision device, the spec information (for example, a shape of a connector, an output current, an output voltage, a phase number, a rated capacitance, a rated frequency, and a rated power factor) of the charging device equipped in the charging station is acquired by the charging station information acquisition means. Even in the case where the charging station is unoccupied, if a charging device appropriate to the shape of the connector for charging the vehicle requiring charging or the current, voltage, and the like during the charging is not equipped, the charging cannot be performed. Accordingly, in the information processing device, the charging station determination means determines the charging station on which the information is to be provided among the charging stations equipped with the charging device having specs appropriate for specs (for example, a shape of a connector, an input current, an input voltage, and a phase number) relating to charging of the vehicle requiring charging based on the spec information of the charging device. In this manner, in the information provision device, the charging station on which the information is to be provided is determined based on the spec information of the charging device, so that it is possible to provide the information on the charging station appropriate for the vehicle requiring charging to the vehicle.

In addition, in the information provision device according to the above aspect of the invention, it is preferable that the charging station information acquisition means acquires information on an operating situation of the charging station, and the charging station determination means estimates a degree of congestion of the charging station based on the information of the operating situation acquired by the charging station information acquisition means and the traffic flow acquired by the traffic-flow acquisition means and determines the charging station on which the information is to be provided based on the estimated degree of the congestion. In this manner, a degree of congestion is estimated based on the operation situation information and traffic information of the charging station, so that it is possible to accurately estimate the degree of congestion. Therefore, the charging station which provides information is determined based on the degree of congestion, so that it is possible to accurately provide information on the charging station appropriate for the vehicle requiring charging to the vehicle.

In addition, in the information provision device according to the above aspect of the invention, it is preferable that the charging station determination means excludes a charging station, of which an amount of power for the charging is likely to be insufficient, at the time of determining the charging station on which the information is to be provided. In this case, it is possible to avoid the vehicle requiring charging being provided with information on a charging station inappropriate for the vehicle.

In addition, in the information provision device according to the above aspect of the invention, the traffic flow is the number of vehicles using external electrical energy in the vicinity of the charging station. In this case, it is possible to estimate a degree of congestion of the charging station with high accuracy.

In addition, it is preferable that the information provision device according to the above aspect of the invention is mounted on the vehicle requiring charging. In this case, for example, since the process of the charging station determination means is performed by each vehicle, it is possible to determine a charging station appropriate for the situation of each vehicle.

Advantageous Effects of Invention

According to a power supply control device according to the invention, an amount of power which is to be supplied to a charging station is controlled based on traffic information for roads in the vicinity of the charging station, so that it is possible to perform the supply of appropriate power to the charging station in real time.

In addition, according to an information provision device according to the invention, a charging station on which information is to be provided is determined based on a traffic flow of vehicles using external electrical energy in the vicinity of the charging station, so that it is possible to provide information on a charging station appropriate for a vehicle requiring charging to the vehicle.

In other words, according to a power supply control device and an information provision device according to the invention, it is possible to perform appropriate charging.

DESCRIPTION OF EMBODIMENTS

First Embodiment

Hereinafter, a power supply control device according to an embodiment of the invention will be described with reference to the drawings. In addition, in each figure, the same or corresponding components are denoted by the same reference sign, and redundant description thereof is omitted.

In the embodiment, the power supply control device according to the invention is applied to a charging station system center of a power supply system. In the power supply system according to the embodiment, a charging station system center, a power company system center, and a car company system center can perform wired communication with each other. In addition, in the power supply system according to the embodiment, the charging station system center can perform wired communication with each charging station, and the car company system center can perform wireless communication with each vehicle. In addition, in the power supply system according to the embodiment, power lines are disposed between a power company (power transmission facilities) and each charging station and between the charging stations, so that the supply of power to each charging station can be performed.

Figure 1:
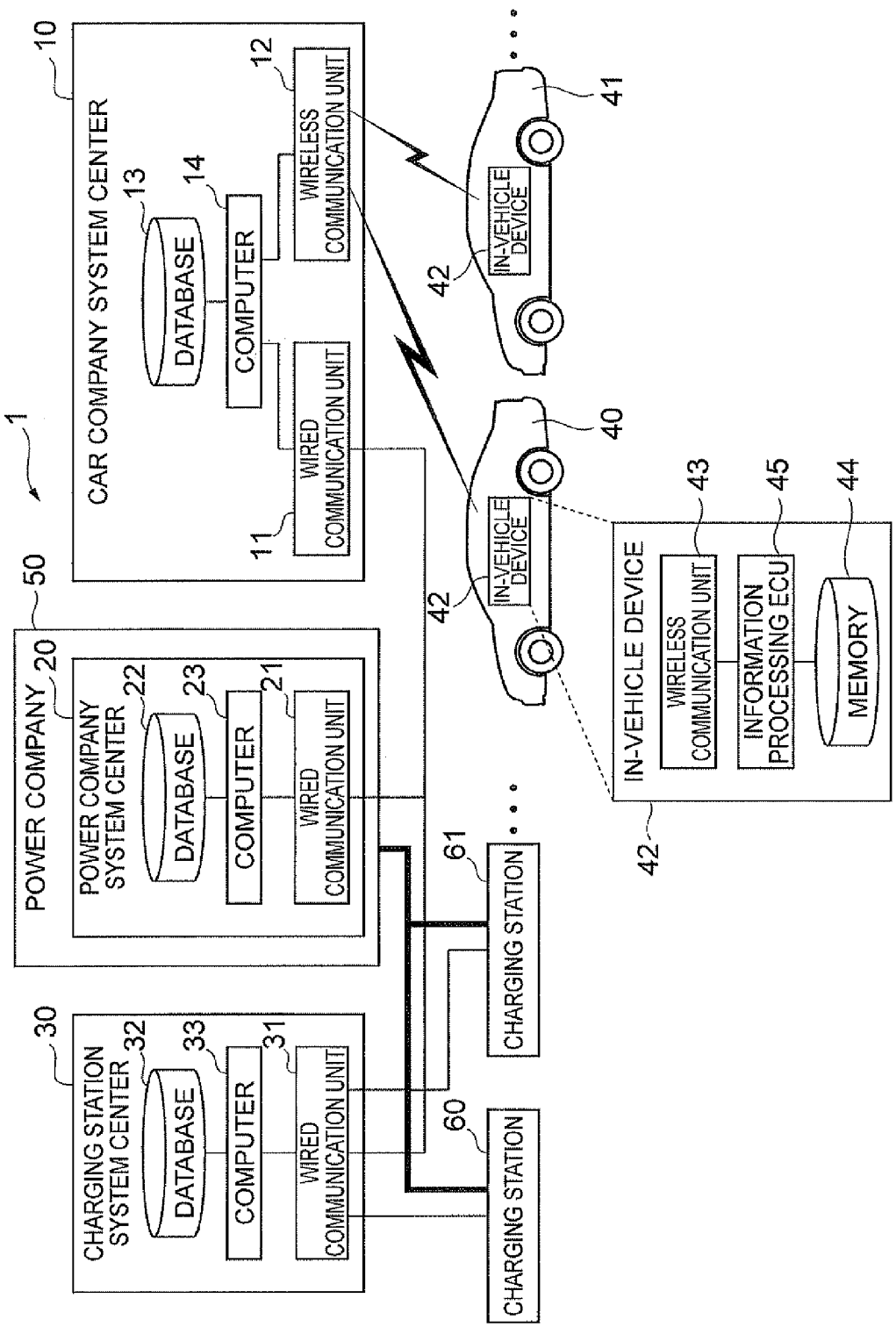
FIG. 1 is a diagram illustrating a configuration of a power supply system according to an embodiment.
Figure 2:
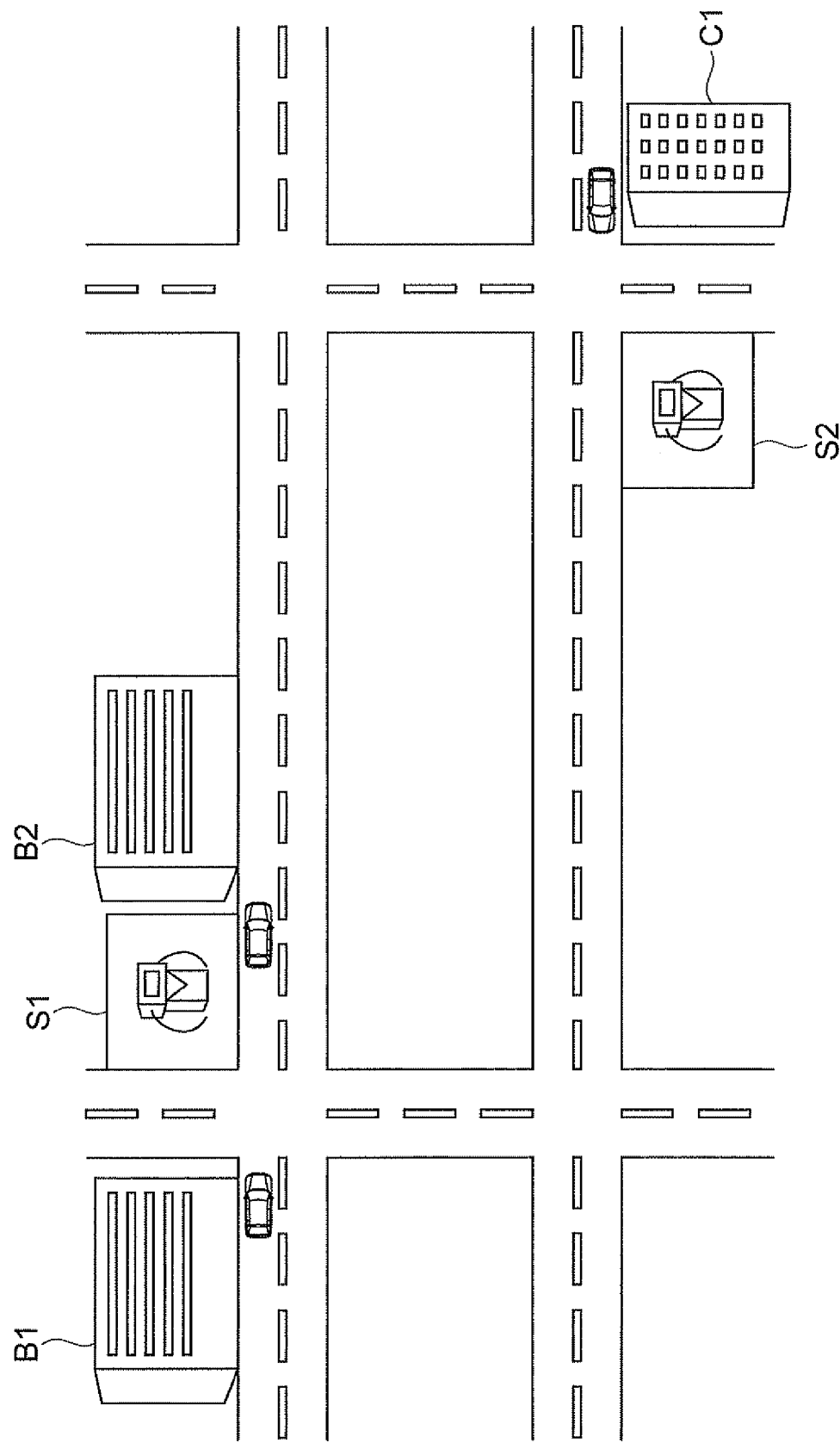
FIG. 2 is a diagram illustrating an example of an arrangement of charging stations.
Figure 3:
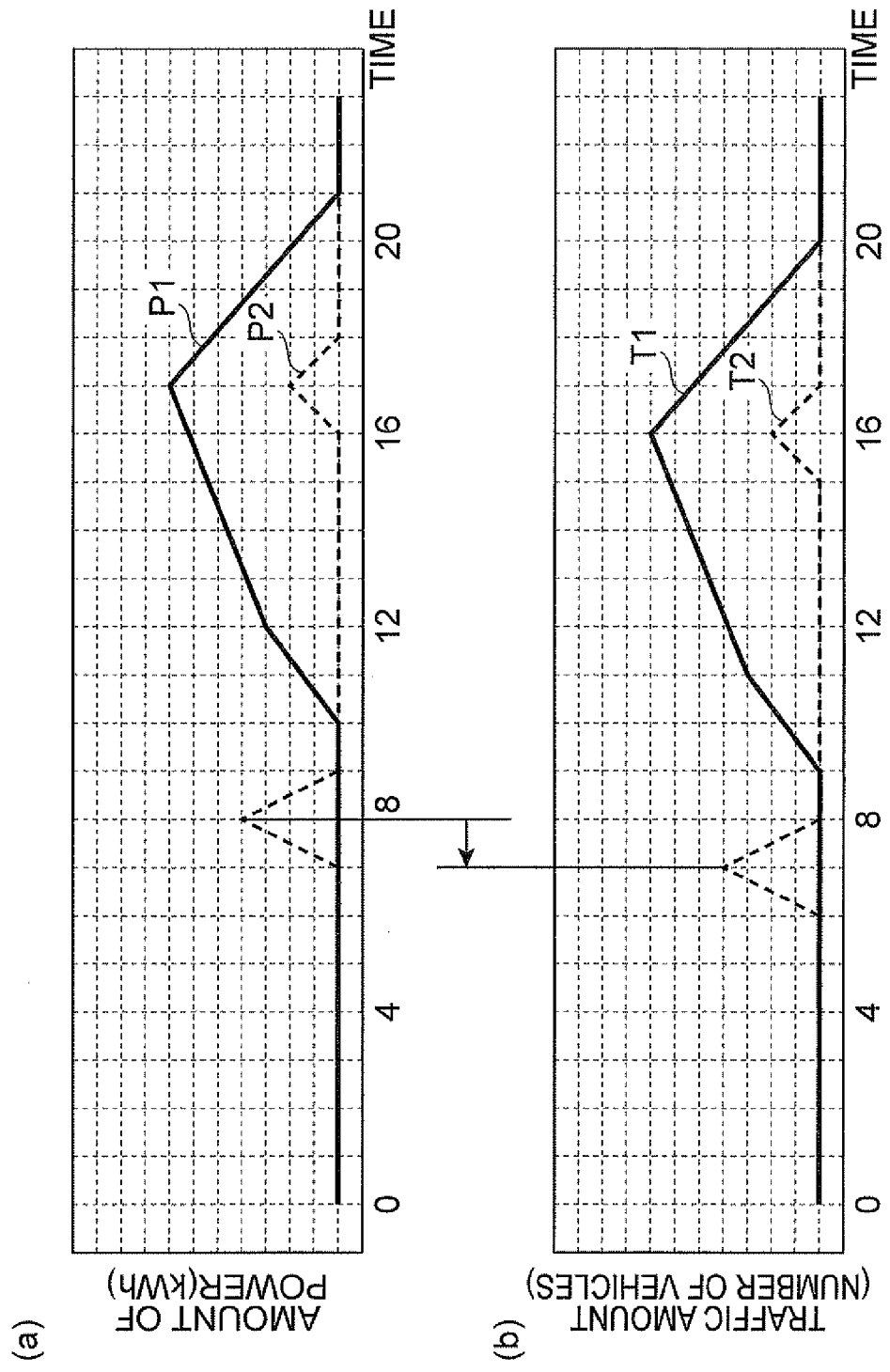
FIG. 3 is a diagram illustrating a relationship between an amount of power consumed in a charging station and a traffic amount in the vicinity of the charging station; (a) illustrates a time change in the amount of power; and (b) illustrates a time change in the traffic amount.

The power supply system 1 according to the embodiment will be described with reference to FIGS. 1 to 3. FIG. 1 is a diagram illustrating a configuration of the power supply system according to the embodiment. FIG. 2 is a diagram illustrating an example of an arrangement of the charging stations. FIG. 3 is a diagram illustrating a relationship between an amount of power consumed in a charging station and a traffic amount in the vicinity of the charging station.

Before the power supply system 1 is described in detail, a relationship between the amount of power consumed by the charging to the vehicles in the charging station and the traffic amount (traffic flow) in the vicinity of the charging station will be described. In the example illustrated in FIG. 2, the charging station S1 is disposed in the vicinity of various commercial facilities B1, B2, . . . (or within the facilities), and the charging station S2 is disposed in the vicinity of various company facilities C1, . . . (or within the facilities). FIG. 3 illustrates a time change in the amount of power consumed in each of the charging stations S1 and S2 and a time change in the traffic amount (the number of vehicles) in the vicinity of each of the charging stations S1 and S2. In addition, in the example illustrated in FIG. 3, for the better understanding, the amount of power and the traffic amount are configured so as to have the same form in their trends to change.

In the vicinity of the commercial facilities, in the time period when the commercial facilities are open, many customers move. And thus, as illustrated by reference sign T1 in FIG. 3(*b*), there is a large traffic amount (the number of vehicles) in a wide time period. Therefore, as illustrated by reference sing P1 in FIG. 3(*a*), the amount of power consumed in the charging station S1 in the vicinity of the commercial facilities increases in a wide time period which is slightly delayed from the change in the traffic amount.

On the other hand, in the vicinity of company facilities, since most people who work at companies are moved in office-going and office-leaving time periods, as illustrated by reference sign T2 in FIG. 3(*b*), the traffic amount increases in relatively narrow time periods in the morning and in the evening. Therefore, as illustrated by reference sign P2 in FIG. 3(*a*), the amount of power consumed in the charging station S2 in the vicinity of the company facilities increases in the two narrow time periods which are slightly delayed from the change in the traffic amount.

In this manner, since the amount of power consumed in the charging station depends on the traffic amount (particularly, the traffic amount of externally rechargeable vehicles) in the vicinity of the charging station, the change in the amount of power is slightly delayed from the change in the traffic amount. The traffic amount in the vicinity of the charging station is also changed even at the same location according to the change in various factors such as week days, weather, and congestion due to traffic restrictions or traffic accidents. Therefore, the traffic amount (particularly, the traffic amount of roads adjacent to the charging station) in the vicinity of the charging station is collected in real time, so that it is possible to estimate the amount of power (rate of operation) consumed in the charging station by using the traffic amount in real time.

Now, the power supply system 1 is described in detail. The power supply system 1 is configured to include a car company system center 10 which exchange information, a power company system center 20, and a charging station system center 30, in-vehicle devices 42 of the vehicles 40, 41, . . . , a power company 50 which exchanges power with charging stations 60, 61, . . . , and the charging stations 60, 61, . . . . Particularly, the charging station system center 30 controls the amount of power which is to be supplied to the charging stations in real time based on the traffic flow (traffic information) of roads in the vicinity of each charging station so that the amount of power to be stored in each of the charging stations 60, 61, . . . is always an appropriate amount.

In addition, although one car company system center, one power company system center, and one charging station system center are illustrated in FIG. 1, in some cases, there are a plurality of the centers for each type of centers. For example, the car company system centers may be installed for respective car companies, the power company system centers may be installed for respective power companies, and the charging station system centers may be installed for respective charging station managing company.

The car company system center 10 is a center operated by a car company. The car company system center 10 collects information from each of the vehicles 40, 41, . . . and provides traffic information obtained by processing the collected information to the charging station system center 30. In the providing of traffic information, an information providing fee may be billed by the charging station system center 30. The traffic information is information of each of the charging stations 60, 61, . . . controlled by the charging station system center 30. The traffic information includes the number of vehicles on a road adjacent to a charging station within a predetermined range from the charging station, a driving type (an engine vehicle, a plug-in hybrid vehicle, an electric vehicle, or the like) of each vehicle, a vehicle type (a general vehicle, a truck, a bus, or the like) of each vehicle, and the like. The information collected from vehicles includes driving types, vehicle types, current positions, destinations, information on roads during traveling, SOC (State Of Charge) of batteries, and the like.

The car company system center 10 includes a wired communication unit 11, a wireless communication unit 12, a database 13, and a computer 14. The wired communication unit 11 is a unit for communicating with the charging station system center 30 and the like via a network in a wired manner. The wireless communication unit 12 is a unit for communicating with each of the vehicles 40, 41, . . . in a wireless manner. The database 13 is a database for storing information collected from each vehicle, traffic information for roads in the vicinity of each charging station, or the like. The computer 14 processes the information transmitted from each of the vehicles 40, 41, . . . and generates traffic information for roads in the vicinity of each charging station. In the information process, vehicles which are within a predetermined range from each of the charging stations 60, 61, . . . during the traveling of the roads adjacent to the charging station are extracted based on the information from each of the vehicles 40, 41, . . . , and the traffic information including the number of extracted vehicles, the driving type, vehicle type, SOC, and the like of each vehicle is generated. In addition, instead of generating the traffic information through the car company system center 10, the collected information of each vehicle may be transmitted to the charging station system center 30, as it is, and allow the charging station system center 30 to perform the information process.

A in-vehicle device 42 for providing information is mounted on each of the vehicles 40, 41, . . . . The in-vehicle device 42 includes a wireless communication unit 43, a memory 44, an information processing ECU (Electronic Control Unit) 45, and the like. The wireless communication unit 43 is a unit for communicating with the car company system center 10 in a wireless manner. The memory 44 is a memory for storing information collected from each in-vehicle system or a variety of information of a vehicle. The information processing ECU 45 collects information on the current position or the destination from a navigation system (not shown) or information such as SOC from an SOC sensor (not shown) and generates information which is to be supplied to the car company system center 10 and includes the collected information and a variety of information (driving type and vehicle type) of a vehicle.

The power company system center 20 is a center operated by the power company 50 which supplies power. If the power company system center 20 receives an instruction of amount of power which is to be supplied to each of the charging stations 60, 61, . . . from the charging station system center 30, the power company system center 20 immediately issues a command according to the instruction so that power transmission facilities (not shown) of the power company 50 transmit power.

The power company system center 20 includes a wired communication unit 21, a database 22, and a computer 23. The wired communication unit 21 is a unit for communicating with the charging station system center 30 or the like via a network in a wired manner. The database 22 is a database for storing power transmission history (power transmission times, an amount of transmitted power, and the like), a variety of information (location, an allowable charged amount or current charged amount in the station, or the like), or the like of each of the charging stations 60, 61, . . . . The computer 23 controls the supply of power of the power transmission facilities, management of power transmission information, or the like according to a power supplying instruction transmitted from the charging station system center 30 or the like.

The charging station system center 30 is a center operated by a company which manages the charging stations 60, 61, . . . . The charging station system center 30 manages spec information, operation situation information, or the like of each of the charging stations 60, 61, . . . . In addition, the charging station system center 30 controls an amount of power which is to be supplied to each of the charging stations 60, 61, . . . based on the operation situation information of each charging device in the charging station and traffic information for roads in the vicinity of the charging station.

The charging station system center 30 includes a wired communication unit 31, a database 32, and a computer 33. In addition, in the embodiment, the wired communication unit 31 (traffic information acquisition is actually performed by the car company system center 10) corresponds to traffic information acquisition means disclosed in the aspect of the invention; and the computer 33 corresponds to control means disclosed in the aspect of the invention.

The wired communication unit 31 is a unit for communicating with the car company system center 10, the power company system center 20, and each of the charging stations 60, 61, . . . via a network in a wired manner. The database 32 is a database for storing a variety of information (location, spec information, operation situation information, and the like) of each of the charging stations 60, 61, . . . , traffic information of each of the charging stations 60, 61, . . . acquired from, the car company system center 10, or the like. The spec information includes an allowable charged amount or current charged amount in the station and a current, a connecter shape, a rated capacitance, a phase number, a voltage, a rated frequency, a rated power factor, or the like of each charging device. The operation situation information includes charging times of each charging device of the charging station, a charging time or charge amount (amount of power consumed) of each charging, or the like.

If the computer 33 acquires the charging history of each charging device transmitted from each of the charging stations 60, 61, . . . , the computer 33 generates the operation situation information of the charging station from the charging history. In addition, the computer 33 estimates the rate of operation of each of the charging stations 60, 61, . . . based on the traffic information in the vicinity of each of the charging stations 60, 61, . . . , which is transmitted from the car company system center 10. Next, the computer 33 controls the amount of power, which is to be supplied to each of the charging stations 60, 61, . . . , based on the estimated rate of operation.

A method of estimating the rate of operation will be described. In the estimation of the rate of operation, the number of vehicles which have a possibility of using the charging station is estimated from the number of vehicles in the vicinity of the charging station and the driving type, vehicle type, or the like of each vehicle. In the estimation, vehicles which are motor-driven cars having externally rechargeable batteries such as plug-in hybrid vehicles or electric vehicles and which are not vehicles traveling regular routes such as buses (vehicle traveling a regular route uses its own infrastructure) and have a possibility of charging at the destination are counted. At this time, the SOCs of the batteries, destinations, or the like of the counted vehicles are taken into consideration, so that the vehicles having low a possibility of charging on the way are removed from the count number. Next, the rate of operation of the charging station is estimated based on the final count number of vehicles and the actual operation situation information of the charging station. Basically, the rate of operation increases in proportion to the increase in the count number of vehicles. In the estimation, the current rate of operation may be estimated; or the rate of operation after a predetermined time such as 30 minutes or 1 hour may be estimated. This rate of operation may be a rate of operation according to a charging time in the charging station or the number of vehicles using the charging station, and the rate of operation may also be a rate of operation according to an amount of power consumed in the charging. Although the charging time or the number of vehicles using the charging station is the same, if the charging method or the like is different, the amount of power consumed in the charging is different. Therefore, the rate of operation according to the amount of power is more useful for controlling the amount of power which is to be supplied to the charging station.

In addition, in the case where weather information is obtained when the rate of operation is estimated, the rate of operation is estimated by taking the weather into consideration. For example, in the case where it rains or snows, it is estimated that the number of charging vehicles will be increased, and thus, the rate of operation is set to be higher than a normal rate of operation. In addition, in the case where accident information or traffic restriction information is obtained when the rate of operation is estimated, the rate of operation is estimated by taking the information into consideration. In the case where traffic congestion occurs due to an accident or traffic restriction, if time is taken to break through the congestion, it is estimated that the number of charging vehicles will be increased, and thus, the rate of operation is set to be higher than the normal rate of operation.

Control of the amount of power based on the rate of operation will be described. Basically, a large amount of power to be supplied is set according to an increase in the rate of operation; a small amount of power to be supplied is set according to a decrease in the rate of operation; and the supply of power is stopped when the rate of operation is low (including the rate of operation of zero) and the charged amount in the charging station is sufficient. A power supplying instruction indicating the set amount of power to be supplied or the stoppage of the supply of power is generally issued by the power company system center 20, and the supply of power from the power company 50 is performed. However, in the time period when the rate of power supplied from the power company 50 is high and in the case where the rate of operations of other charging stations are low and the charged amount in the station is excessively sufficient, the supply of power from other charging stations is performed.

Each of the charging stations 60, 61, . . . includes a wired communication unit (not shown) to transmit spec information (particularly, information of which the value such as a current charged amount in the station is changed) or charging history of each charging device to the charging station system center 30 at regular time intervals.

Figure 4:
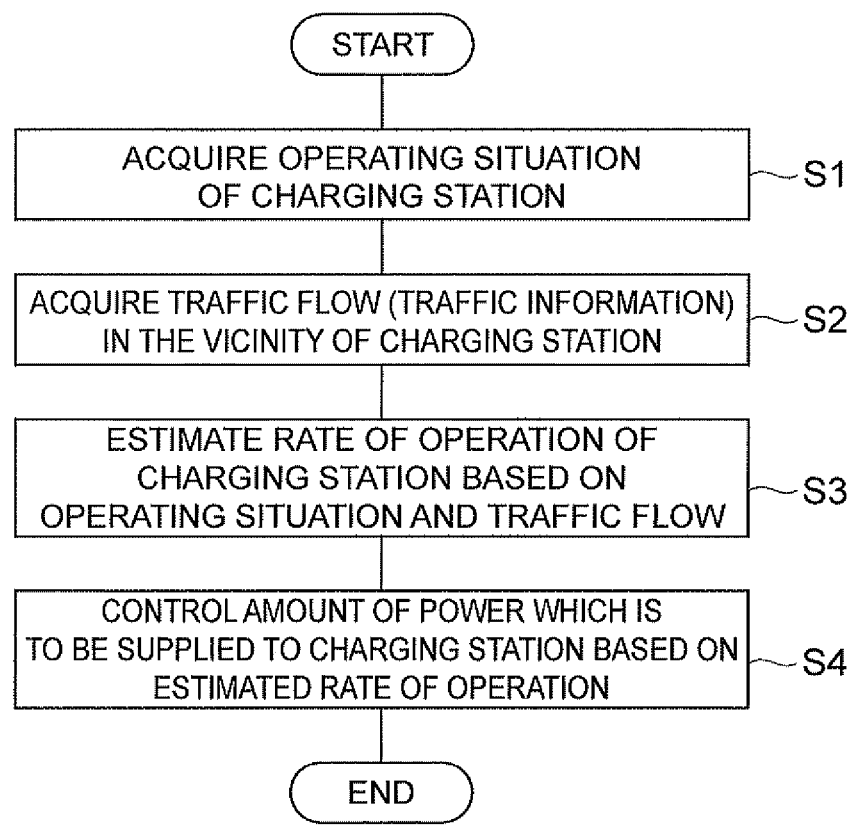
FIG. 4 is a flowchart illustrating a procedure of processes in a charging station system center in FIG. 1.

Operations of the control of the supply of power in the power supply system 1 will be described with reference to FIG. 1. Particularly, the processes in the charging station system center 30 will be described with reference to a flowchart of FIG. 4. FIG. 4 is a flowchart illustrating a procedure of the processes in the charging station system center in FIG. 1.

Each of the charging stations 60, 61, . . . transmits the spec information (particularly, information of which the value such as a current charged amount in the station is changed) or the charging history of each charging device to the charging station system center 30 at regular time intervals. The charging station system center 30 allows the wired communication unit 31 to receive information from each of the charging stations 60, 61, ... and allows the computer 33 to generate the operation situation information from the information of each of the charging stations 60, 61, ... (S1).

The in-vehicle device 42 of each of the vehicles 40, 41, ... transmits information such as a current position, a destination, SOC of a battery, a driving type, and a vehicle type to the car company system center 10 through the wireless communication unit 43. The transmission may be performed at regular time intervals or according to a request from the car company system center 10. The car company system center 10 allows the wireless communication unit 12 to receives information from each of the vehicles 40, 41, ... , allows the computer 14 to generate traffic information (a traffic flow) in the vicinity of each of the charging stations 60, 61, ... by processing the information from each of the vehicles 40, 41, ... , and allows the wired communication unit 11 to transmit traffic information of each charging station to the charging station system center 30. The transmission may be performed at regular time intervals or according to a request from the charging station system center 30. The charging station system center 30 receives traffic information of each charging station from the car company system center 10 through the wired communication unit 31 (S2).

The computer 33 of the charging station system center 30 estimates the real-time rate of operation of each of the charging stations 60, 61, ... based on the actual operating situation of each of the charging stations 60, 61, ... and the traffic information (particularly, a traffic flow of vehicles (the number of vehicles) having possibility of using the charging station) in the vicinity of each charging station at regular time intervals (S3). Next, the computer 33 of the charging station system center 30 controls the amount of power which is to be supplied to each of the charging stations 60, 61, ... based on the rate of operation of each charging station at regular time intervals (S4). Herein, for example, the charging station system center 30 allows the computer 33 to determine the amount of power to be supplied based on the rate of operation and to generate a power supplying instruction indicating the amount of power to be supplied and the charging station and allows the wired communication unit 31 to transmits the power supplying instruction to the power company system center 20. If the power company system center 20 receives the power supplying instruction from the charging station system center 30 through the wired communication unit 21, the power company system center 20 allows the computer 23 to control the supply of power to the power transmission facilities according to the power supplying instruction. Therefore, only the amount of power to be supplied indicated by the power supplying instruction is supplied from the power transmission facilities to the charging station.

According to the power supply system 1 (particularly, the charging station system center 30), the amount of power which is to be supplied to the charging station is controlled based on the traffic information for roads in the vicinity of the charging station, so that it is possible to supply the power appropriate for the charging station in real time. Therefore, the amount of power stored in the charging station is always maintained to be an appropriate amount, so that it is possible to prevent the amount of power from being too large and too small.

The computer 33 of the charging station system center 30 estimates the rate of operation of the charging station by taking into consideration the traffic information for roads in the vicinity of the charging station (particularly, the traffic flow (the number of vehicles) of vehicles having possibility of using the charging station). Therefore, it is possible to estimate the rate of operation of the charging station in real time with high accuracy, so that it is possible to determine the amount of power necessary for the charging station from the rate of operation in real time.

Hereinbefore, although the embodiments according to the invention are described, the invention is not limited to the above embodiments, but it may be embodied in various forms.

For example, in the embodiment, the power supply system is configured to include three centers of the charging station system center, the car company system center, and the power company system center. However, the centers may be integrated into one or two centers, and the system may also be configured to include different centers such as a center of managing the weather or a center of managing traffic accidents, traffic restrictions, or the like.

In addition, in the embodiment, the configuration is made so that the charging station system center controls the amount of power of each charging station in real time based on the traffic information. However, the control may be performed by a different center such as the car company system center or the power company system center.

In addition, in the embodiment, the traffic information is the information generated by the car company system center based on the information collected from each vehicle. However, different traffic information such VICS (Vehicle Information and Communication System) information may be used. For example, in the case of using the VICS information, a VICS receiver may be configured so as to be included in the charging station system center or each vehicle.

In addition, the power supply system may be a system where a power dividing company is disposed in a power network. The power dividing company is a company which performs power division in supplying power from a power company to each charging station, supplying power between charging stations, or power exchange. The power dividing company is disposed, for example, at each local area and is operated by a charging station managing company, a power company, or a completely different company.

In addition, the power line for performing the charging from the charging device of the charging station to the vehicle may be added with a communication line for receiving and transmitting information, so that wired communication can be performed between the vehicle and the charging device. Accordingly, the charging station (moreover, the charging station system center) can also collect information from the vehicles.

In addition, in the embodiment, the computer of the charging station system center determines the amount of power which is to be supplied to the charging station, and the power according to the amount of power to be supplied is supplied from the power transmission facilities of the power company to the charging station. However, for example, the computer of the charging station system center may provide at least a portion of the determined amount of power to be supplied by using private power generation (for example, power generation using a fuel cell) in the charging station. In this case, the computer of the charging station system center can control the amount of power which is to be supplied to the charging station by changing at least one of the power generation amount of the private power generation of the charging station and the charged amount of the storage battery of the charging station.

Second Embodiment

Hereinafter, an information provision device according to an embodiment of the invention will be described with reference to the drawings. In addition, in each figure, the same or corresponding components are denoted by the same reference sign, and redundant description thereof is omitted.

In the embodiment, the information provision device according to the invention is applied to an in-vehicle battery charging guiding device of a battery charging guiding system. In the battery charging guiding system according to the embodiment, a charging station system center and a car company system center can perform wired communication with each other. In addition, in the battery charging guiding system according to the embodiment, the charging station system center can perform wired communication with each charging station, and the car company system center can perform wireless communication with each vehicle.

Figure 5:
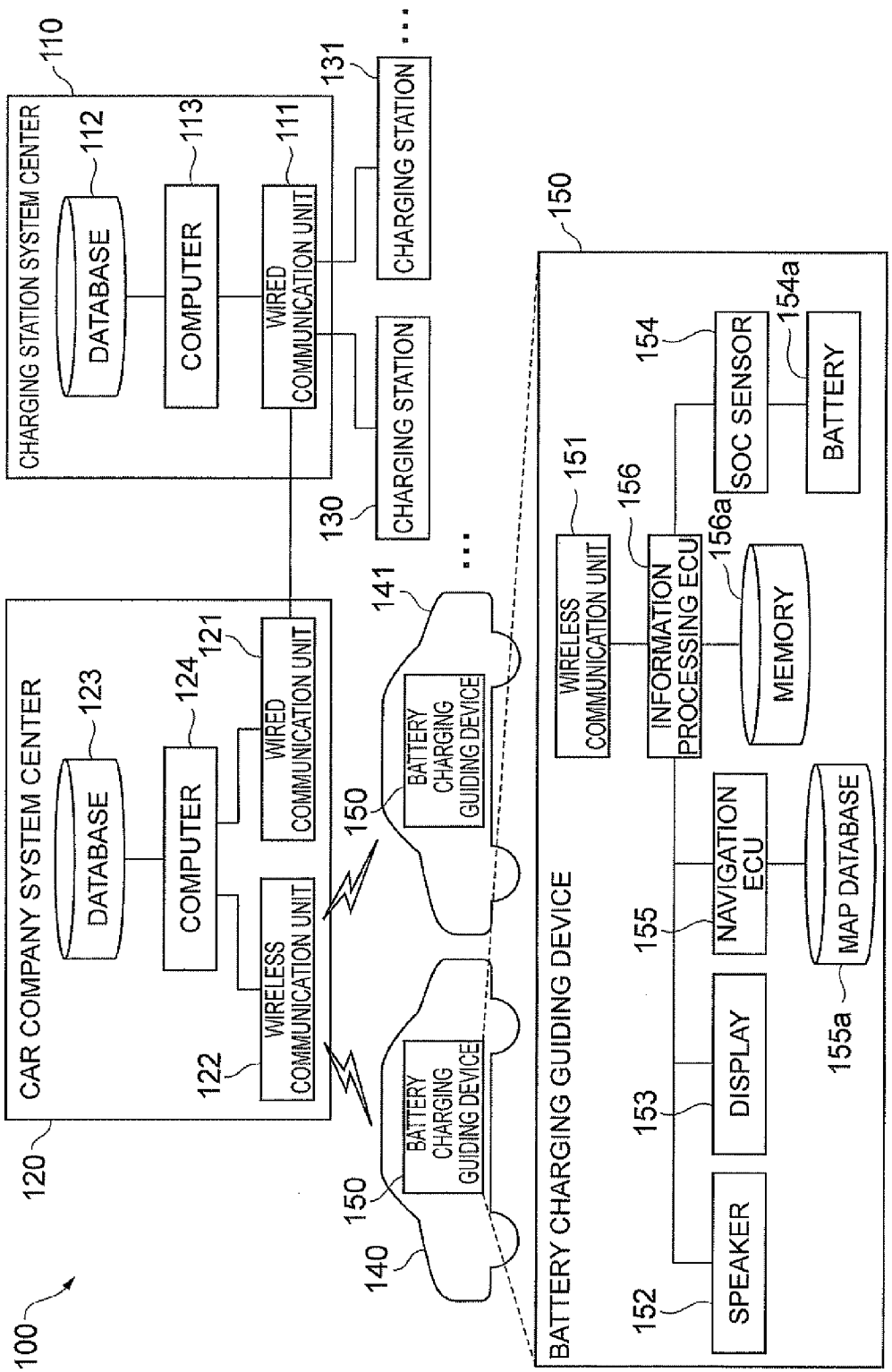
FIG. 5 is a diagram illustrating a configuration of a battery charging guiding system according to an embodiment.
Figure 6:
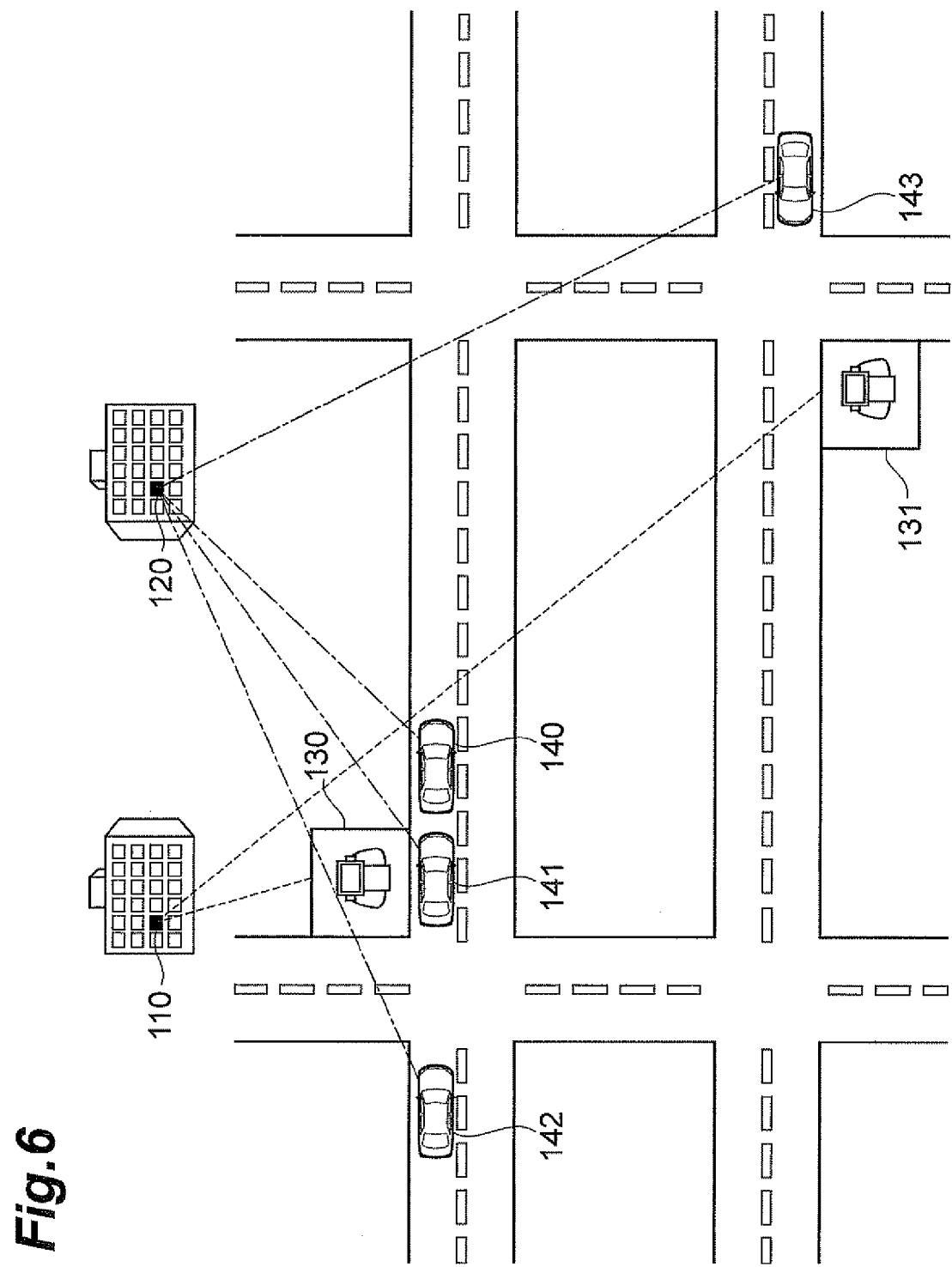
FIG. 6 is a diagram illustrating an example of an arrangement of charging stations.

The battery charging guiding system 100 according to the embodiment will be described with reference to FIGS. 5 and 6. FIG. 5 is a diagram illustrating a configuration of the battery charging guiding system according to the embodiment. FIG. 6 is a diagram illustrating an example of an arrangement of the charging stations.

The battery charging guiding system 100 is configured to include a charging station system center 110 and a car company system center 120 which exchange information, charging stations 130, 131, . . . , and battery charging guiding devices 150 of the vehicles 140, 141, . . . . Particularly, in the case where the host vehicle is in a charging-required situation, the in-vehicle battery charging guiding device 150 selects the charging station, which is appropriate for the specs relating to charging of the host vehicle and of which the waiting time is very small, among the charging stations within the travelable range of the host vehicle and guides the host vehicle to the charging station.

In addition, although only one charging station system center and only one car company system center are illustrated in FIG. 5, in some cases, a plurality of the respective centers may exist. For example, the charging station system centers may be installed for the respective managing companies of the charging stations, and the car company system centers may be installed for the respective car companies.

The charging station system center 110 is a center operated by a company which manages the charging stations 130, 131, . . . . The charging station system center 110 collects information from the charging stations 130, 131, . . . and provides spec information or operation situation information obtained by processing the collected information to the car company system center 120.

The charging station system center 110 includes a wired communication unit 111, a database 112, and a computer 113. The wired communication unit 111 is a unit for communicating with the car company system center 120 and each of the charging stations 130, 131, . . . via a network in a wired manner. The database 112 is a database for storing a variety of information (position information, spec information, operation situation information, or the like) on each of the charging stations 130, 131, . . . . The spec information includes an allowable charged amount or current charged amount of a station and a shape of a connector, an output current, an output voltage, a phase number, a rated capacitance, a rated frequency, a rated power factor, and the like of each charging device. The operation situation information includes the number of charging devices during charging in the charging station, a scheduled time of charging completion) of each charging device during charging, and the like. If the computer 113 acquires information transmitted from each of the charging stations 130, 131, . . . , the computer 113 generates the operation situation information from the information. In addition, if the computer 113 acquires time-varying specs such as a current charged amount of a station transmitted from each of the charging stations 130, 131, . . . , the computer 113 generates spec information including the specs. In addition, the allowable charged amount in the station and the specs which are known in advance such as a shape of connector of each charging device are stored in the database 112.

Each of the charging stations 130, 131, . . . includes a wired communication unit (not shown) to transmit information on specs such as a current charged amount in the station, information indicating whether or not each charging device is charging, and information on operating situation such as a scheduled time of charging completion in the case where each charging device is charging to the charging station system center 110 every predetermined time interval.

The car company system center 120 is a center operated by a car company. The car company system center 120 collects information from each vehicle and provides traffic information obtained by processing the collected information according to a request from each of the vehicles 140, 141, . . . where the battery charging guiding device 150 is mounted. The traffic information includes information of each of the charging stations 130, 131, . . . and the number of vehicles on a road adjacent to the charging station within a predetermined range from a charging station, a driving type (an engine vehicle, a plug-in hybrid vehicle, an electric vehicle, the like) of each vehicle, a vehicle type (a general vehicle, a truck, a bus, and the like), destination, an SOC (State Of Charge) of a battery, and the like. The information collected from vehicles includes driving types, vehicle types, current positions, destinations, information on roads during traveling, SOCs of batteries, and the like. In addition, the car company system center 120 collects spec information or operation situation information of each of the charging stations 130, 131, . . . from the charging station system center 110 and provides the information according to a request from each of the vehicles 140, 141, . . . where the battery charging guiding device 150 is mounted.

The car company system center 120 includes a wired communication unit 121, a wireless communication unit 122, a database 123, and a computer 124. The wired communication unit 121 is a unit for communicating with the charging station system center 110 or the like via a network in a wired manner. The wireless communication unit 122 is a unit for communicating with each vehicle in a wireless manner. The database 123 is a database for storing information collected from each vehicle, traffic information for roads in the vicinity of each charging station, and spec information, operation situation information, or the like of each charging station.

The computer 124 processes the information transmitted from each vehicle to generate the traffic information for roads in the vicinity of the charging station. In the information process, the vehicles within a predetermined range from the charging station during traveling on the road adjacent to the charging station are extracted based on the information collected from the vehicles in each of the charging stations 130, 131, . . . to generate the traffic information including information such as the number of extracted vehicles or a driving type, a vehicle type, a destination, an SOC, and the like of each vehicle. In addition, if an information providing request for the charging station is received from a vehicle on which the battery charging guiding device 150 is mounted, the computer 124 extracts the spec information and operation situation information of each charging station and the traffic information in the vicinity of each charging station from the database 123 and transmit the extracted information on each charging station to the vehicle by using the wireless communication unit 122.

Each of the vehicles 140, 141, ... is a vehicle using external electrical energy which can be externally charged to a battery such as a plug-in hybrid vehicle and an electric vehicle and on which the battery charging guiding device 150 is mounted. The battery charging guiding device 150 determines whether or not charging of the battery of the host vehicle is required in order to travel to the destination, and in the case where it is determined that the charging is required, the battery charging guiding device 150 provides information for guiding the host vehicle to the charging station optimal to the host vehicle (the specs being matched and the waiting time being small).

The battery charging guiding device 150 includes a wireless communication unit 151, a speaker 152, a display 153, an SOC sensor 154, a navigation ECU (Electronic Control Unit) 155, an information processing ECU 156, and the like. In addition, in the embodiment, the map database 155a (in the case where position information or the like of the charging station is stored) and the wireless communication unit 151 (information acquisition is actually performed by the charging station system center 110) correspond to a charging station information acquisition means disclosed in the aspect of the invention; the wireless communication unit 151 (information acquisition is actually performed by the car company system center 120) corresponds to a traffic-flow acquisition means disclosed in the aspect of the invention; and the information processing ECU 156 corresponds to a charging station determination means disclosed in the aspect of the invention.

The wireless communication unit 151 is a unit for communicating with the car company system center 120 in a wireless manner. The speaker 152 is an in-vehicle speaker used by a navigation unit or the like. For example, if the speaker 152 receives an audio signal for outputting sound from the navigation ECU 155, the speaker 152 outputs sound according to the audio signal. The display 153 is an in-vehicle display used by the navigation unit or the like. For example, if the display 153 receives a display signal for displaying an image from the navigation ECU 155, the display 153 displays the image according to the display signal. The SOC sensor 154 is a sensor for detecting SOC (remaining charge amount) of the in-vehicle battery 154a. The battery 154a is an externally rechargeable battery and is used to drive a motor.

The navigation ECU 155 is configured to include a CPU (Central Processing Unit), various types of memories, and the like and is an electronic control unit of a navigation unit (not shown). The navigation ECU 155 has a current-position calculating function, a map display function, a destination setting function, a route searching function, a route guiding function, and the like. In the current-position calculating function, a current position and progression direction of a host vehicle are calculated based on detection values of various sensors such as a car speed sensor and a gyro sensor and GPS (Global Positioning System) information received by a GPS receiver by using map data for map matching stored in the map database 155a. In the map display function, an image indicating the current position and progression direction of the host vehicle on the map is generated by using map data for display in the vicinity of the current position stored in the map database 155a, and the display signal is transmitted to the display 153. In the destination setting function, an image for setting the destination is generated according to manipulation information from an input unit such as a touch display by using data for setting destination stored in the map database 155a, and the display signal is transmitted to the display 153. In the route searching function, if the destination is set, a route from the current position to the destination is searched for by using data for route searching stored in the map database 155a. In the route guiding function, every time the current position is updated, the current position and the guide point on the route are compared. If the current position reaches the guide point, a guiding sound is generated by using data for audio output of the guide point stored in the map database 155a, and the audio signal is transmitted to the speaker 152; and a guiding image is generated by using data for display of the guide point stored in the map database 155a, and the display signal is transmitted to the display 153. In addition, in the route guiding function, every time the current position is updated, the remaining distance or arrival time to the destination is calculated.

The information processing ECU 156 is configured to include a CPU, various types of memories, and the like and is an integrated electronic control unit of an information processing system. Particularly, the information processing ECU 156 has a battery charging guiding function for performing main processes of the battery charging guiding device 150. Hereinafter, only the battery charging guiding function will be described.

Every time the SOC of the battery 154a is detected by the SOC sensor 154, the information processing ECU 156 temporarily stores the detection value in the memory 156a. In addition, every time the route information is updated by the navigation ECU 155, the information processing ECU 156 temporarily stores the route information (particularly, the remaining distance to the destination) in the memory 156a. In addition, in this manner, in the case where the navigation unit is mounted, the route information may be acquired from the in-vehicle navigation unit. However, in the case where the navigation unit is not mounted, the route information may be acquired from a center (for example, the car company system center 120) outside the vehicle. In addition, in the case where the destination is not set by the user of the host vehicle, the destination is estimated, and the route information for the estimated destination is used.

The information processing ECU 156 calculates a charge amount (estimated required battery charge amount) of the battery 154a, which is necessary for the case where the vehicle travels the remaining distance to the destination by using only the motor, based on the SOC of the battery 154a and the route information. In the case where an amount of power consumed during the traveling of the remaining distance to the destination by using only the motor is subtracted from the current SOC of the battery 154a, the estimated required battery charge amount is an amount corresponding to a portion of the SOC after the subtraction which is less than the lower limit of the effective range of use of the battery 154a. In other words, in the case where the SOC after the subtraction is less than the lower limit of the effective range of use of the battery 154a, the current SOC of the battery 154a is insufficient for traveling to the destination with only the motor. Therefore, if the battery 154a is charged with at least the estimated required battery charge amount, the SOC is within the effective range of use of the battery 154a at the time of arrival to the destination. On the other hand, in the case where the SOC after the subtraction is more than the lower limit of the effective range of use of the battery 154a, although the traveling to the destination is performed by only the motor with the current SOC of the battery 154a, the SOC is within the effective range of use of the battery 154a at the time of arrival to the destination, and thus, the charging of the battery 154a is unnecessary. In this case, the estimated required battery charge amount is set to zero.

The information processing ECU 156 determines based on the estimated required battery charge amount whether or not charging of the battery 154a is necessary for the arrival to the destination. Herein, in the case where the estimated required battery charge amount is zero, it is determined that charging is not necessary; and in the case where the estimated required battery charge amount is larger than zero, it is determined that charging is necessary. In addition, this determination may be performed with a certain margin. The reason for providing the margin is the consideration of safety, for example, the case of drastically using the power of the battery 154a due to emergency avoidance or the like.

In the case where it is determined that the charging to the battery 154a is needed, the information processing ECU 156 searches the charging station included in the travelable range of the host vehicle based on the database (map database 155a) storing the information on the charging station (particularly, position information). The travelable range may be included in a range along a route from the current position of the host vehicle to the destination, or the travelable range may be included in a predetermined range around the route as a center. In addition, the travelable range may be a range including all the routes to the destination, or the travelable range may be a route within a predetermined distance from the current position among the routes to the destination. In addition, in the case where position information or the like of the charging station is not stored in the host vehicle, the travelable range of the host vehicle is transmitted to the car company system center 120, and the charging station is searched in the travelable range by the car company system center 120 or the charging station system center 110.

The information processing ECU 156 transmits the information providing request for each charging station within the travelable range to the car company system center 120 by using the wireless communication unit 151. Next, the information processing ECU 156 acquires spec information and operation situation information of each charging station received from the car company system center 120 through the wireless communication unit 151 and temporarily stores the acquired information in the memory 156a. In addition, the information processing ECU 156 acquires the traffic information in the vicinity of each charging station received from the car company system center 120 through the wireless communication unit 151 and temporarily stores the acquired information in the memory 156a.

The information processing ECU 156 selects an optimal charging station for the host vehicle among the charging stations in the travelable range based on the spec information and operation situation information of each changing station and the traffic information in the vicinity of each charging station. As a selecting method, first, the charging station having specs matching the specs (the spec information being stored in the memory 156a in advance) on the charging of the host vehicle is selected. For example, the charging station having the specs where the shape of the connector of the charging device of the charging station is matched with the shape of the connector for charging the host vehicle, the AC phase number of the host vehicle side is matched with the AC phase number of the charging station side, and the charging from the charging device of the charging station can be performed within the input current range and the input voltage range during the charging of the host vehicle is selected. At this time, the charging station of which the current charged amount in the station in the spec information is small and which has possibility that the amount of power for charging is insufficient may be excluded. In addition, a degree of congestion of the charging station is estimated from the operation situation information of the charging station and the traffic information in the vicinity of the charging station, and the charging station of which the degree of congestion is lowest (the waiting time for starting the charging is smallest (including the case where there is no waiting time)) is selected among the charging stations of which the specs are matched with each other. For example, vehicles which are motor-driven cars having externally rechargeable batteries such as plug-in hybrid vehicles or electric vehicles and which are not vehicles traveling regular routes such as buses (vehicle traveling a route uses its own infrastructure) and have a possibility of charging at the destination are counted from the traffic information in the vicinity of the charging station. At this time, by taking into consideration the SOCs of the batteries, the destinations, and the like of the counted vehicles, the vehicles having low possibility of charging at the destination are excluded from the count number. Therefore, a degree of mixture (rate of operation) of the charging station after a predetermined time (for example, a time taken for the host vehicle to arrive at the charging station) is estimated based on the counted number (traffic flow) of the vehicles having possibility of finally charging and the actual operation situation information (the number of charging devices which are charging and the scheduled time of charging completion of each charging device which is charging) of the charging station. Basically, the degree of congestion increases in proportion to the number of count of the vehicles having a possibility of charging.

The information processing ECU 156 generates a sound for notifying that the remaining charge amount of the battery is insufficient until the vehicle arrives at the destination and the information (for example, position information, a distance to the station or an arrival time, and a charging time (normal charging and rapid charging) taken for charging a full charge amount or an estimated required battery charge amount) on the charging station selected as an optimal charging station for the charging and transmits an audio signal to the speaker 152, or the information processing ECU 156 generates an image for displaying the information and transmits a display signal to the display 153. In addition to notifying or displaying the information on the selected charging station, the information processing ECU 156 may issue the charging station as a passing point to the navigation ECU 155 (navigation unit) and allow the route searching function of the navigation ECU 155 to search for a route to the charging station to display the route to the charging station on the map or allow the route guiding function of the navigation ECU 155 to perform guiding of the route to the charging station.

In addition, in the case of a vehicle using no external electrical energy such as an engine vehicle or a non-plug-in hybrid vehicle, an in-vehicle device (not shown) for providing information to the car company system center 120 is mounted. The in-vehicle device includes a wireless communication unit, a memory, an information processing ECU, and the like to transmit information such as a driving type, a vehicle type, a current position, a destination, information of roads during traveling, or SOC of a battery to the car company system center 120.

Figure 7:
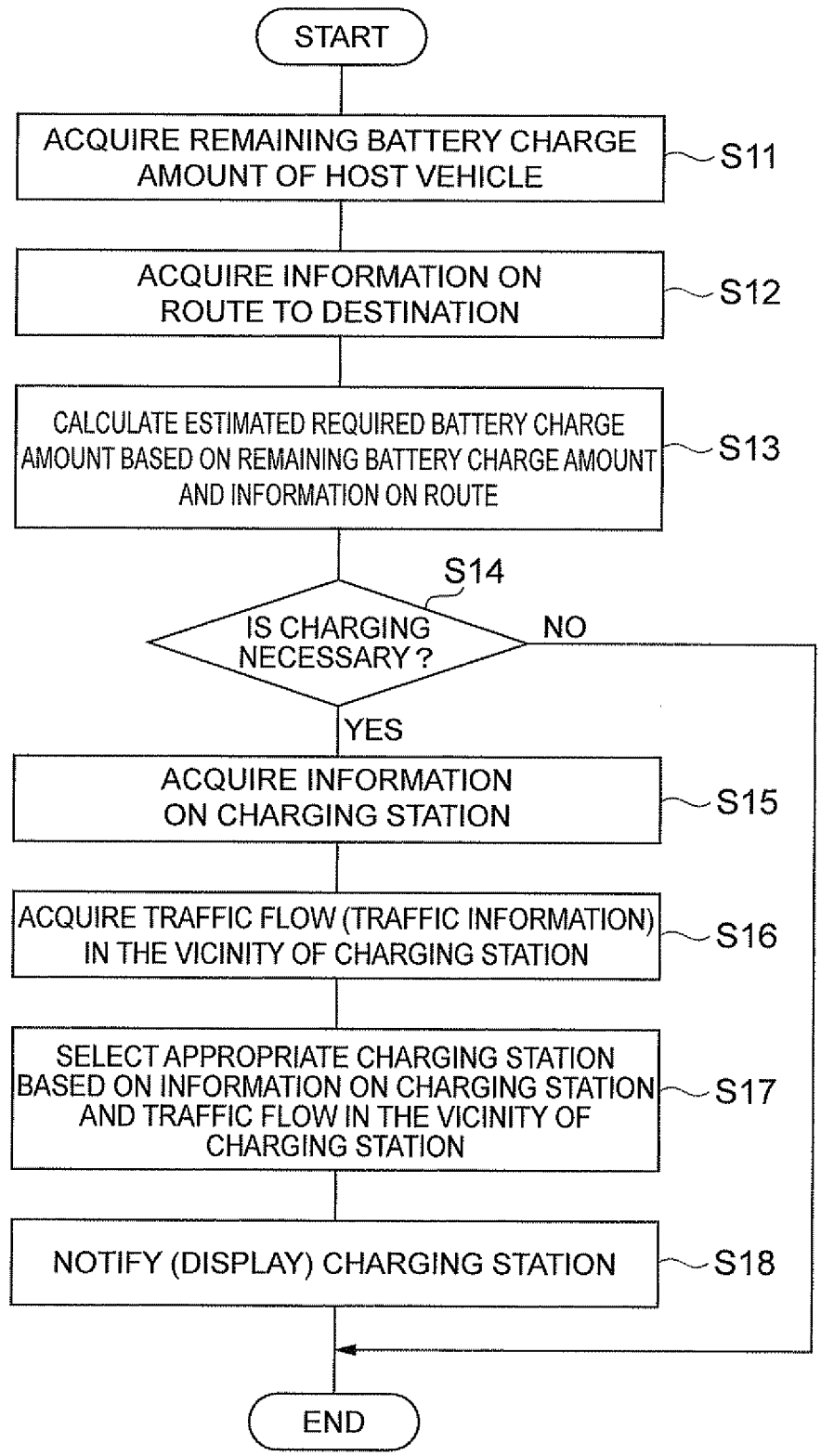
FIG. 7 is a flowchart illustrating a procedure of processes in an in-vehicle battery charging guiding device in FIG. 5.

The operations of the battery charging guiding system 1 will be described with reference to FIG. 5. Particularly, the processes of the battery charging guiding device 150 will be described with reference to a flowchart of FIG. 7. FIG. 7 is a flowchart illustrating a procedure of the processes in the in-vehicle battery charging guiding device in FIG. 5.

Each of the charging stations 130, 131, . . . transmits information on specs (particularly, information of which the value such as a current charged amount in the station is changed), information indicating whether or not each charging device is being used for the charging, and information such as a scheduled time of charging completion in the case of being used for the charging to the charging station system center 110 at regular time intervals. At regular time intervals, the charging station system center 110 allows the wired communication unit 111 to receive information from each of the charging stations 130, 131, . . . and allows the computer 113 to generate spec information or operation situation information including information indicating that a value such as a current charged amount of each of the charging stations 130, 131, . . . is changed. Next, the charging station system center 110 allows the wired communication unit 111 to transmit the spec information or operation situation information of each of the charging stations 130, 131, . . . to the car company system center 120. The car company system center 120 allows the wired communication unit 111 to receive the spec information or operation situation information of each of the charging stations 130, 131, . . . from the charging station system center 110 and stores the received information in the database 123 of each of the charging stations 130, 131, . . . .

Each of the vehicles 140, 141, . . . allows the wireless communication unit 151 to transmit information such as a driving type, a vehicle type, a current position, a destination, information of roads during traveling, or SOC of the battery 154a to the car company system center 120 at regular time intervals. The car company system center 120 allows the wireless communication unit 122 to receive the information from each of the vehicles 140, 141, . . . , generates traffic information in the vicinity of each of the charging stations 130, 131, . . . from the information, and stores the generated information in the database 123 of each of the charging stations 130, 131, . . . .

The battery charging guiding device 150 of each of the vehicles 140, 141, . . . repetitively performs the following processes at regular time intervals. The SOC sensor 154 detects the SOC (remaining charge amount) of the battery 154a (S11). The information processing ECU 156 introduces the SOC of the battery 154a into the ECU. In addition, if the destination is set, the navigation ECU 155 searches the route to the destination; and every time the current position is updated, the navigation ECU 155 calculates the remaining distance from the current position to the destination along the route or the like (S12). The information processing ECU 156 introduces the route information such as a remaining distance to the destination into the ECU.

The information processing ECU 156 calculates the estimated required battery charge amount based on the SOC of the battery 154a and the route information (particularly, the remaining distance to the destination) (S13). Next, the information processing ECU 156 determines based on the estimated required battery charge amount whether or not charging is necessary for the arrival to the destination (S14). In the case where it is determined in S14 that charging is not necessary, this process is ended.

In the case where it is determined in S14 that charging is necessary, the information processing ECU 156 searches charging stations within the travelable range of the host vehicle and transmits the information providing request for the charging stations within the travelable range to the car company system center 120 through the wireless communication unit 151. The car company system center 120 allows the wireless communication unit 122 to receive the information providing request, allows the computer 124 to extract the spec information and operation situation information of each charging station indicated in the information providing request and the traffic information in the vicinity of the charging stations from the database 123; and allows the wireless communication unit 122 to transmit the extracted information on each charging station to a vehicle (battery charging guiding device 150). The battery charging guiding device 150 receives the information through the wireless communication unit 151; acquires the spec information and operation situation information of each charging station within the travelable range of the host vehicle (S15); and acquires the traffic information in the vicinity of the charging station (S16).

The information processing ECU 156 selects an optimal charging station for the host vehicle among the charging stations within the travelable range of the host vehicle based on the spec information and operation situation information of each of the charging station and the traffic information (particularly, a traffic flow of vehicles using external energy) in the vicinity of each of the charging stations (S17). Next, the information processing ECU 156 transmits an audio signal for notifying the information on the selected charging station (for example, position information, distance or arrival time to the station, information on a route to the station, and information on guidance to the station) to the speaker 152 or transmits a display signal for displaying the information to the display 153 (S18). If the speaker 152 receives the audio signal, the speaker 152 audio-outputs the information on the optimal charging station (S18). If the display 153 receives the display signal, the display 153 displays information on the optimal charging station (S18).

According to the battery charging guiding system 100 (particularly, the battery charging guiding device 150), the charging station is selected based on the traffic information (particularly, the number of vehicles using external electrical energy (vehicles having a possibility of charging batteries)) in the vicinity of the charging station, so that it is possible to select the charging station appropriate for the host vehicle of which charging is necessary, and it is possible to guide the host vehicle to the charging station. Accordingly, if the guided host vehicle arrives to the charging station, it is possible to start the charging with a short waiting time or with no waiting time, so that it is possible to secure a sufficient charging time. As a result, if a user of the host vehicle so desires, normal charging can also be performed. If the normal charging is performed, it is possible to perform full charging, and it is possible to suppress deterioration of the battery.

In addition, according to the battery charging guiding system 100, the charging station is selected based on spec information of the charging station (particularly, spec information of the charging device), so that it is possible to select the charging station equipped with the charging device appropriate for the specs on the charging of the host vehicle of which the charging is needed. In addition, in the charging station having a short waiting time, if there is no charging device matching the specs, it is not possible to perform the charging.

Hereinbefore, although the embodiments according to the invention are described, the invention is not limited to the above embodiments, but it may be embodied in various forms.

For example, in the embodiment, the battery charging guiding system is configured to include two centers of the charging station system center and the car company system center. However, the centers may be integrated into one center, and the system may also be configured to include different centers.

In addition, in the embodiment, the battery charging guiding device is configured so as to guide the vehicle to the optimal charging station. However, the invention may also be applied to a device that provides only the information on the optimal charging station.

In addition, in the embodiment, the traffic information is the information generated by the car company system center based on the information collected from each vehicle. However, different traffic information such VICS (Vehicle Information and Communication System) information may be used. For example, in the case of using the VICS information, a VICS receiver may be configured so as to be included in the car company system center or each vehicle.

In addition, in the embodiment, the configuration is made so that the main processes of the battery charging guiding device are executed by the information processing ECU. However, the main processes may be executed by different ECUs such as a navigation ECU, or a dedicated ECU may be used.

In addition, in the embodiment, the battery charging guiding device (information provision device) is configured as a vehicle-mounded device. However, the device may be configured to be disposed outside the vehicle, for example, at the car company system center or the like, and information on an optimal charging station may be transmitted from the device outside the vehicle to the vehicle in a wireless manner or the like.

In addition, in the embodiment, the determination whether or not charging is necessary is configured by calculating an estimated required battery charge amount and performing determining based on the estimated required battery charge amount. However, the determination whether or not charging is necessary may be performed according to different methods. For example, in the case where a driver of a vehicle determines that charging is necessary, the driver may perform predetermined input manipulation, and the determination is performed based on the input manipulation.

In addition, the embodiment exemplifies a method of selecting a charging station based on the spec information and operation situation information of the charging station and the traffic information in the vicinity of the charging station. However, other methods may be employed.

In addition, in the embodiment, the configuration is made so that, as a traffic flow of the vehicles using external electrical energy in the vicinity of the charging station, the number of vehicles having a possibility of charging is acquired from the traffic information in the vicinity of the charging station. However, different parameters such as a degree of congestion of the vehicles using external electrical energy or a traveling time between points may also be employed as a traffic flow of the vehicles using external electrical energy in the vicinity of the charging station.

In addition, in the case where the specs of the charging of an externally rechargeable vehicle are standardized and the charging station side also corresponds to the specs, since it is not necessary to determine the spec information of the vehicle side and the spec information of the charging station side, the charging station may be selected based on only the traffic information in the vicinity of the charging station (also the operation situation information of the charging station, if necessary).

In addition, a communication line for receiving and transmitting information may be disposed to a power line for performing charging from the charging device of the charging station to the vehicle, so that wired communication can be performed between the vehicle and the charging device. Therefore, the charging station (moreover, the charging station system center) may also collect information from the vehicle.

INDUSTRIAL APPLICABILITY

According to the invention, it is possible to provide a power supply control device and an information provision device capable of allowing appropriate charging.

REFERENCE SIGNS LIST

1: power supply system, 10: car company system center, 11, 21, 31: wired communication unit, 12, 43: wireless communication unit, 13, 22, 32: database, 14, 23, 33: computer, 20: power company system center, 30: charging station system center, 40, 41: vehicle, 42: in-vehicle device, 44: memory, 45: information processing ECU, 50: power company, 60, 61: charging station, 100: battery charging guiding system, 110: charging station system center, 111, 121: wired communication unit, 112, 123: database, 113, 124: computer, 120: car company system center, 122, 151: wireless communication unit, 130, 131: charging station, 140, 141, 142, 143: vehicle, 150: battery charging guiding device, 152: speaker, 153: display, 154: SOC sensor, 154a: battery, 155: the navigation ECU, 155a: map database, 156: information processing ECU, 156a: memory.

The invention claimed is:

1. A power supply control device controlling the supply of power to a charging station, comprising:
   a traffic information acquisition device acquiring traffic information for roads in a vicinity of the charging station; and
   a controller controlling an amount of power which is to be supplied to the charging station based on the traffic information for roads in the vicinity of the charging station acquired by the traffic information acquisition device,
   wherein the controller estimates a rate of operation of the charging station based on the traffic information and controls the amount of power which is to be supplied to the charging station based on the estimated rate of operation,
   wherein the controller takes into consideration at least one of accident information and traffic restriction information at a time of estimating the rate of operation,
   wherein the controller controls the amount of power which is to be supplied to the charging station by changing at least one of a power generation amount of private power generation of the charging station and a charged amount of a storage battery of the charging station, and
   wherein the traffic information is a counted number of vehicles using external energy in the vicinity of the charging station.

2. The power supply control device according to claim 1, wherein the controller estimates the rate of operation based on the counted number of vehicles and an actual operating situation of the charging station.

3. An information provision device providing information on a charging station to a vehicle requiring charging and being mounted on the vehicle, comprising:
   a charging station information acquisition device acquiring information on charging stations;
   a traffic-flow acquisition device acquiring a traffic flow of vehicles using external electrical energy in a vicinity of each of the charging stations on which the information is acquired by the charging station information acquisition device; and
   a charging station determination device determining the charging station on which the information is to be provided among the charging stations on which the information is acquired by the charging station information acquisition device based on the traffic flow of the vehicles using external electrical energy in the vicinity of each of the charging stations, which is acquired by the traffic-flow acquisition device, wherein the traffic flow is a counted number of vehicles using external electrical energy in the vicinity of the charging station.

4. The information provision device according to claim 3, wherein the charging station information acquisition device acquires spec information of charging devices equipped in the charging stations, and wherein the charging station determination device determines the charging station on which the information is to be provided among the charging stations equipped with the charging devices having specs appropriate for specs relating to charging of the vehicle requiring charging based on the spec information of the charging devices acquired by the charging station information acquisition device.

5. The information provision device according to claim 3, wherein the charging station information acquisition device acquires information on an operating situation of the charging station, and wherein the charging station determination device estimates a degree of congestion of the charging station based on the information of the operating situation acquired by the charging station information acquisition device and the traffic flow acquired by the traffic-flow acquisition device and determines the charging station on which the information is to be provided based on the estimated degree of the congestion.

6. The information provision device according to claim 3, wherein the charging station determination device excludes a charging station, of which an amount of power for the charging is likely to be insufficient, at a time of determining the charging station on which the information is to be provided.

* * * * *